May 8, 1951        T. G. PRENTICE        2,552,113

WEEDLESS FISHING LURE

Filed April 4, 1950

INVENTOR.
Thomas G. Prentice.
BY
Stanley Lightfoot
Attorney.

Patented May 8, 1951

2,552,113

UNITED STATES PATENT OFFICE 2,552,113

WEEDLESS FISHING LURE

Thomas G. Prentice, Detroit, Mich.

Application April 4, 1950, Serial No. 153,804

1 Claim. (Cl. 43—35)

This invention relates to a weedless fishing lure, such as of the type described in Patent No. 2,470,861 granted to me May 24, 1949, and has for its object to provide special safety and locking features whereby very positive securing of the parts of the device in a casting position wherein the body of the lure encircles the shank of the hook so that the rear end of the said body is in protective proximity to the points of the hook barbs, such locking being effective to resist any tendency of forces resulting from the casting operation to release the body from this position and thereby inadvertently expose the hook shank before the lure has been taken by a fish.

The said invention contemplates the provision of a rod having means for attachment of a fishing line at the forward end and a hook having its shank linked to the rear end of the said rod; a tubular body reciprocal on said rod and normally urged by a spring to a forward position free of the shank of said hook but movable rearwardly against the resistance of that spring to a position encircling said shank; and a latch in the form of a member longitudinally slidable over the surface of the said body and having its inner end directed inwardly toward said rod over a cam surface at the forward end of said body whereby forward and rearward movement of said member will result in the motion toward and from said rod, whereby the forward extremity of said member may be engaged with and disengaged from said rod in a positive manner.

The invention further contemplates the provision of a suitably positioned stop or recess on said rod for engagement by the forward extremity of said member when the body of said lure is moved rearwardly against the resistance of the spring to its shank-encircling position.

Still further the said invention contemplates the provision of a keeper at the forward end of the said lure body through which the extremity of the locking member passes, engaging with the stop or detent of the sliding rod whereby the locking of the assembly during casting and fishing operations is enhanced.

It is also an object of the invention to provide the aforesaid sliding member with a series of projections or equivalent means for ready engagement by the mouth of the fish in taking the bait so that the pull of the fish on the lure will quickly effect the sliding of the said member on the body to unlatch the extremity of the said member from the rod on which the body is mounted.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein.

Similar characters of reference indicate similar parts in the several figures of the drawings.

Figure 1:
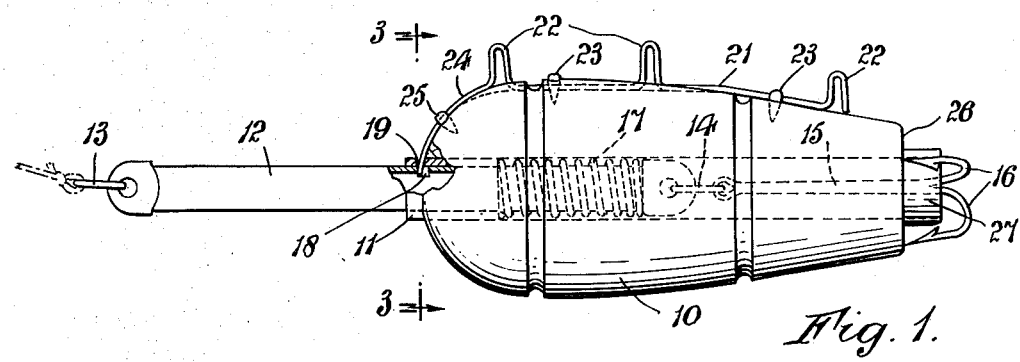
Figure 1 is an elevation of a lure embodying the said invention.

The body or plug proper 10 of the lure is shown as being tubular, having a short sleeve 11 secured in and extending slightly forwardly from the bore of the said body to slidably accommodate the rod 12.

This rod is shown as being provided with a link 13 at its forward end for attachment thereto of a fishing line and a link 14 at its rear end to which is attached the elongated shank 15 of a fish hook having a plurality of barbs 16.

The body 10 is urged forwardly of the rod 12 by the compression spring 17 encircling the rod and bearing at one end against the fixed sleeve 11 and at the other end against an expanded rear portion of the rod which forms the eye for receiving the link 14.

The body 10 may be drawn rearwardly of the rod 12 against the resistance of the spring 17, as shown in Figure 1, to extend over and encircle the shank 15 of the fish hook, in which position the rear end of the said body closely and protectively approaches the points of the barbs 16 of the fish hook, as will be obvious; and the said rod 12 is shown as being provided with a recess 18 intermediate of its length and positioned to register with an opening or slot 19 formed in the wall of the sleeve 11 when the said body 10 is moved against the resistance of the spring 17 to the rearward position illustrated in Figure 1.

Mounted in a guiding recess 20 extending longitudinally of the outer surface of the said body 10 is a bar or member 21 having upstanding projections 22 formed thereon, this bar being maintained against detachment from the body by staples 23 extending transversely thereover, said bar 21 being provided with an arcuate forward extension 24 passing beneath a further staple 25 on the rounded front end of the said body, which round front end acts as a cam over which the front portion 24 of the said bar is slidable so that its extremity will move toward the axis of the rod 12 when the bar 21 is pushed forwardly, and away from this rod when the said bar is moved rearwardly of the body. Thus, when the said body is moved to the position shown in Figure 1, the said bar 21 may be pushed forwardly to cause the extremity of the front end portion of this bar to enter the slot 18 of the rod 12, as clearly shown in the said Figure 1.

As also shown in the said figure, the end portion 24 of the bar 21, when moved into engagement with the slot 18 of the rod 12, passes through the keeper provided in the end of the sleeve 11 by virtue of the said sleeve being slotted at 19. The expansive reaction of the spring 17 draws the member 24 into locking impingement with one of the walls of the keeper, and strain applied to the rod 12 in the opposite direction (as in the act of casting or during the trolling operation) will simply result in pressing the extremity of the member 24 against the forward wall of the said slot 19 where this stress is sufficient to overcome the reaction of the compression spring 17 so that the locking effect is maintained.

Figure 2:
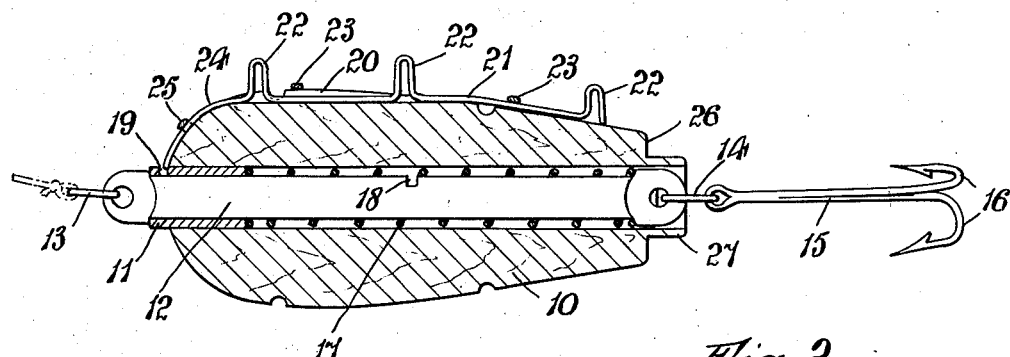
Figure 2 is a longitudinal sectional view of the same.
Figure 3:
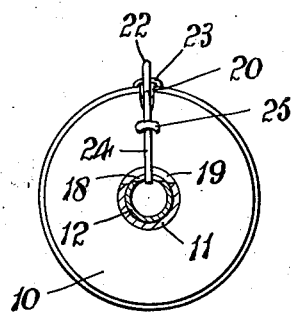
Figure 3 is a transverse section taken on a plane indicated by the line 3—3 in Figure 1.
Figure 4:
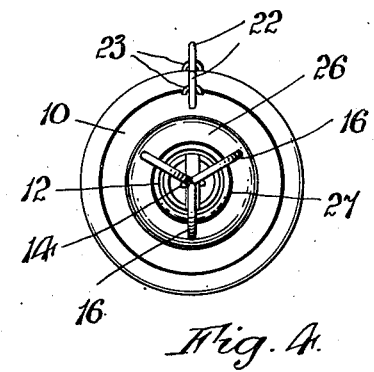
Figure 4 is a rear end view of the device.

However, if the bar 21 is moved rearwardly of the body, as by the pull of a fish closing its mouth about any of the projections 22 of the said bar, the arcuate front end portion 24 simply rides back over the cammed front end of the body 10, thus withdrawing the extremity of the bar portion 24 from its engagement in the slot 18 of the rod 12 in an action which is quite sensitive, thus permitting the parts to assume the position shown in Figure 2 wherein the shank and linkage of the hook is freely exposed to take the fish.

This releasing action of the bar 21 does not of necessity call for any strain being exerted by the fish on the lure such as would be necessary to in any way further compress the spring 17, the releasing action being slowly charged to a simple and easy forward movement of the said bar 21; and it will also be noted that this operation of the bar is in no way dependent on the strength of the bite imposed on the lure or on the said bar, but solely on the rearward movement of the bar in relation to the body such as would almost immediately result from the engagement of one of the projections 22 in the mouth of the fish.

The body 10 is characterized by provision of a shoulder 26 against which the points of the barbs 16 impinge when the lure is in its "closed" condition; and to ensure proper orientation of these barbs about the axis of the lure so that they will be evenly positioned on the said shoulder, the rear end of the body 10 is provided with a coaxial boss or extension 27 of a diameter adapted to closely fit within the barbs 16 of the hook. By such means the hook is caused to assume a position wherein the shank 15 is substantially in true coaxial relation to the bore of the body 10 when the said boss 27 is entered between the said barbs 16.

This invention may be developed within the scope of the following claim without departing from the essential feature of the said invention, and it is desired that the specification and drawing be read as being merely illustrative of a practical embodiment of the same and not in a strictly limiting sense.

What I claim is:

A weedless fishing lure comprising a rod adapted for line attachment at its front end, a barbed hook having an elongated shank linked to the rear end of said rod, a tubular body slidable over said rod and said shank, a compression spring resisting the movement of said body over said rod in the direction of said hook, a longitudinally slidable member on said body, latch means in the form of a portion of said member bent toward said body for securing said body in a position of rearward adjustment on said rod wherein the rear end of said body is in close protective relation to the barbs of said hook, and a cam element on said body for transforming longitudinal movement of said member into radial movement of said latch means relative to said rod.

THOMAS G. PRENTICE.

REFERENCES CITED

The following references are of record in the file of this patent:

UNITED STATES PATENTS

| Number | Name | Date |
| --- | --- | --- |
| 1,072,672 | Sweet | Sept. 9, 1913 |